No. 796,147. PATENTED AUG. 1, 1905.
J. W. REYNOLDS.
DECOY.
APPLICATION FILED MAR. 3, 1904.
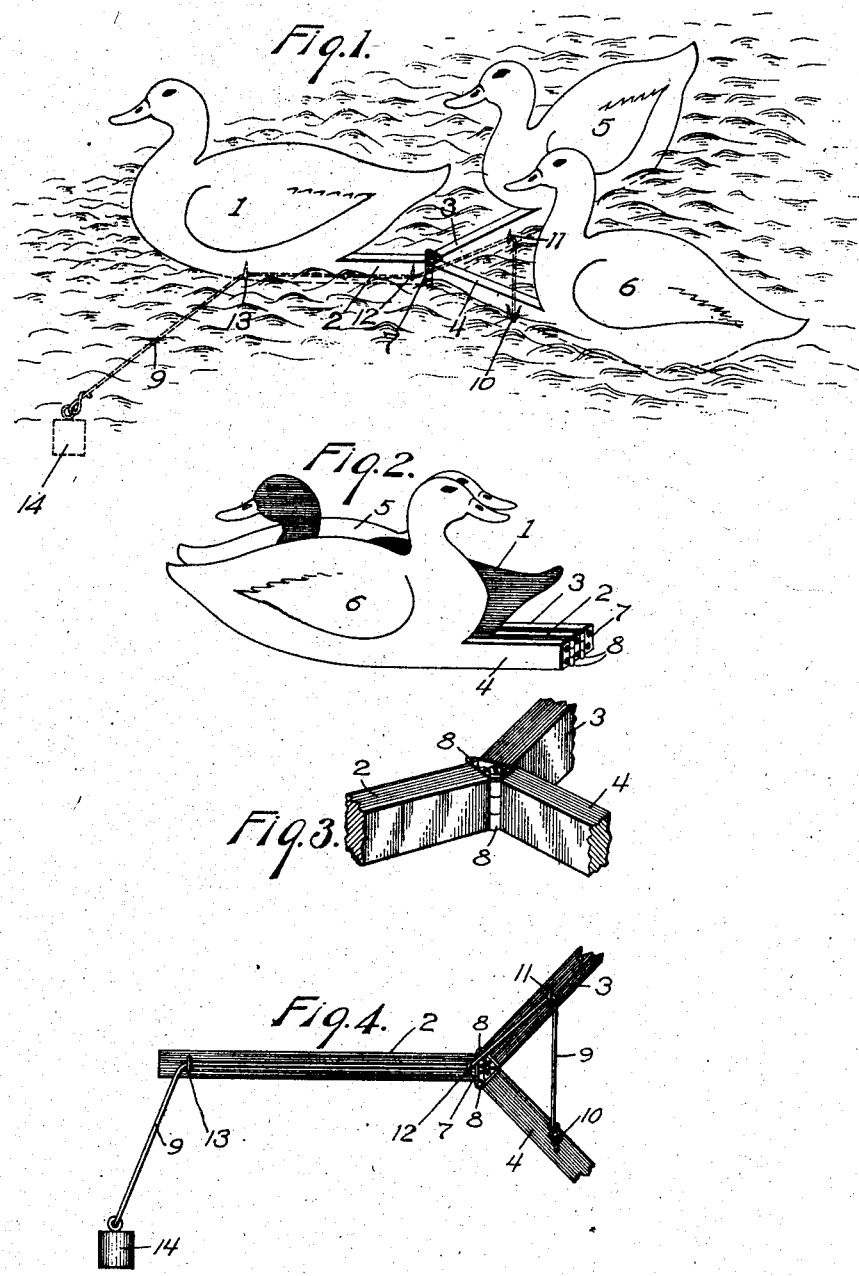

UNITED STATES PATENT OFFICE.

JAMES W. REYNOLDS, OF CHICAGO, ILLINOIS

DECOY.

No. 796,147.      Specification of Letters Patent.      Patented Aug. 1, 1905.

Application filed March 3, 1904. Serial No. 196,315.

*To all whom it may concern:*

Be it known that I, JAMES W. REYNOLDS, a citizen of the United States, residing at Chicago, in the county of Cook and State of Illinois, have invented certain new and useful Improvements in Decoys; and I do hereby declare the following to be a full, clear, and exact description of the invention, such as will enable others skilled in the art to which it appertains to make and use the same.

This invention relates to devices for decoying fowls, and more particularly ducks.

The object of the present invention is to provide a floating decoy, which preferably consists of a plurality of duck-like images jointedly connected together to adapt them to be conveniently folded or collapsed for packing and transportation and which when in use are held in separated relation, such position being augmented by the action of the wind and wave.

For a full understanding of the merits and advantages of my invention reference is to be had to the following description and the accompanying drawings, in which—

Figure 1 is a perspective view of the decoy as it appears in use. Fig. 2 is a perspective view of the decoy device when folded, showing the manner of joining the several sections or supports of which it is composed. Fig. 3 is a perspective, on an enlarged scale, of the jointed ends of the supports; and Fig. 4 is an inverted plan view showing the means for holding the jointed supports distended or in separated relation.

Making renewed reference to the drawings, wherein similar characters of notation indicate corresponding parts appearing in the several illustrations, 1 designates a central or front decoy which when the device is in use breasts the wind and which is secured to or integrally formed upon a rearwardly-extending supporting-section 2. Jointedly connected with the rear ends of this supporting-section 2 are two similar supporting-sections 3 and 4, upon the ends of which are integral or separately-mounted decoys 5 and 6, which when the device is in use are held separated from each other and from the front decoy and its support and also disposed at an angle in the rear of the latter, wherefore one or more of the duck-like figures 1, 5, and 6 will always be presented to the eye of the sportsman in side elevation notwithstanding the different positions to which the device may be shifted by the wind or wave.

With the foregoing description, taken in connection with Fig. 1 of the drawings, it will be apparent that the supporting-sections 2, 3, and 4 act as buoys for the decoys 1, 5, and 6, so that the latter will float with their bodies in vertical position, and by joining these sections together one section forms a support for the other, preventing any or all from falling over on their sides.

The means for joining the ends of the supporting-sections 2, 3, and 4 preferably consists of a double hinge 7, having three plates or leaves, the central one of which is secured to the end of the support 2 and the outer plates are secured to the end of the supports 3 and 4, with their pivots 8 opposite the edges of the central front support 2, so that the rear or outer supports 3 and 4 may be folded flat against the sides of the central front support, one on each side thereof, as shown in Fig. 2. In the folded condition the device may be readily packed and transported, and when these outer supports 3 and 4 are folded outwardly in the rear of the central support 2 the free ends of the outer plates of the hinge abut and prevent the decoys 5 and 6 from coming together, as shown in Figs. 3 and 4. Thus the decoys 5 and 6 are held separated from each other and at a proper angle from the central front decoy 1, as to present themselves in side elevation when viewed from any position.

Means are provided for holding the decoys 5 and 6 separated from and in the rear of the central front decoy 1, and the same consists of a flexible connection 9, one end of which may be made fast to either of the supports 3 and 4, as at 10, and thence extend across to and through an eye 11 on the bottom of one of the supports 3 or 4. From this eye 11 the cord or rope extends toward the inner or jointed end of the support and passes through eyes 12 and 13 near each end of the front support 2 and on the bottom thereof. To the free end of the cord is attached an anchor 14. The pull on the cord emanating from the weight or relatively fixed position of the anchor, which pull may be augmented by the wind or wave, causes the cord to remain taut and hold the supports 3 and 4 with their decoys 5 and 6 in the rear of the decoy 1 and at the proper angle thereto, and this pull holds the free outer edges of the plates of the hinge or the inner ends of the supports 3 and 4 in abutting relation, so that the decoys 5 and 6 cannot be drawn together.

Having thus described my invention, what I claim, and desire to secure by Letters Patent, is—

1. A device of the class described, comprising a plurality of supporting members having decoys thereon, a hinge connecting said members, means for holding the free ends of said members separated, and means including the hinge for limiting the separation thereof.

2. A device of the class described, comprising a front central support, two rear supports hinged to the front support, a cord having one end secured to one of said rear supports and also having a sliding connection with the other rear support and with the front support, an anchor on the other end of the cord to hold the cord taut and the supports separated, and decoys on said supports.

3. A device of the class described, comprising a plurality of buoyant decoy-sections, a hinge having a plurality of plates, each plate being secured to the end of a section, whereby the sections may be folded, an anchor, a flexible connection between the anchor and all of the sections, said connection having a sliding engagement with some of said sections to hold the sections separated.

4. A device of the class described, comprising a front decoy-support, rear decoy-supports hinged at their contiguous end edges to the front support and adapted to have their adjacent outer edges abut when disposed at an angle to the front support.

5. A device of the class described, comprising a front decoy-support, two rear decoy-supports, a hinge having three leaves, the central one of which is secured to the front support, and the outer leaves secured to the rear supports with their pintles disposed adjacent to the contiguous vertical edges of the rear supports, the rear supports being arranged to abut when disposed at an angle to the front support to hold the free ends of the rear supports separated.

6. A device of the class described, comprising a plurality of decoy-supporting members, a hinge composed of a plurality of plates, with a plate attached to one end of each support, the supports always being substantially in the same horizontal plane.

7. A foldable decoy comprising a plurality of decoy-supporting members, a hinge connecting the members and a flexible connection engaging each of said members for holding the members separated.

8. A foldable decoy comprising a plurality of decoy-supporting members, a hinge connecting the members, an anchor, a flexible connection secured to the anchor and to one of the members and having a sliding engagement with the other members, and adapted to be held taut by the wind and waves to hold the members in separated relation.

9. A device of the class described comprising a front decoy-support, rear decoy-supports hinged to the front support and adapted to abut when disposed at an angle to the front support, and means for holding the rear supports in abutting relation.

10. A foldable decoy, comprising a front support and two rear supports terminally connected to the front support and adapted to lie parallel and contiguous to the front support when folded, the terminal connection comprising plates secured one to each support and pivoted at their contiguous edges, the rear supports being arranged to abut when unfolded and disposed at an angle to the front support.

In testimony whereof I affix my signature in presence of two witnesses.

JAMES W. REYNOLDS.

Witnesses:
 Thomas L. Waddington,
 Van B. De Myer.